March 14, 1933. P. A. NIRDLINGER ET AL 1,901,527
UNIVERSAL JOINT AND SUPPORTING STRUCTURE FOR ILLUMINATING DEVICES
Filed Dec. 2, 1930 2 Sheets-Sheet 1
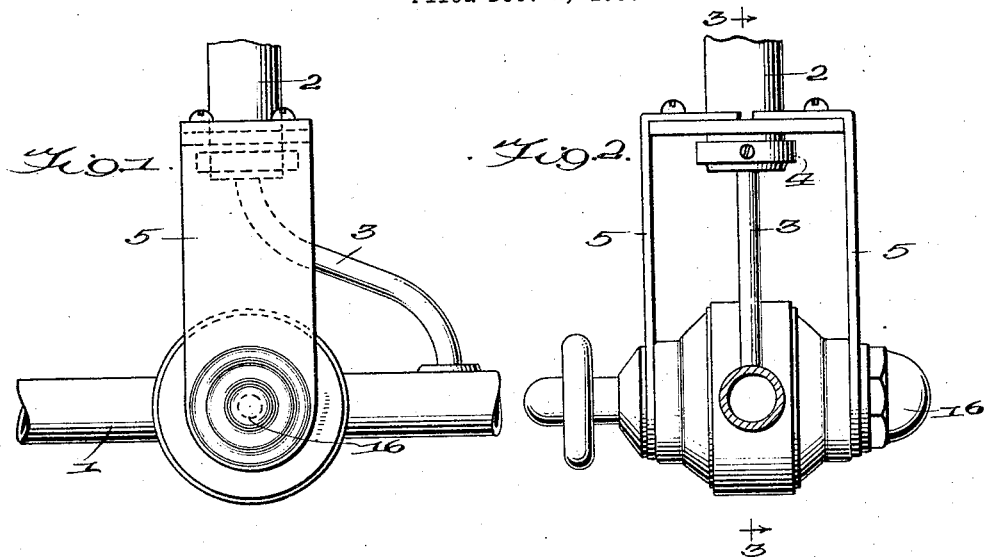
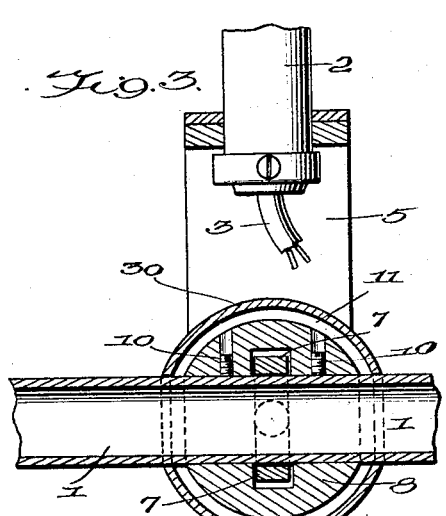
Inventor
P.A. Nirdlinger,
C.D. Nirdlinger,
E.M. Miller,
By Cushman, Bryant & Darby
Attorneys March 14, 1933.     P. A. NIRDLINGER ET AL     1,901,527
UNIVERSAL JOINT AND SUPPORTING STRUCTURE FOR ILLUMINATING DEVICES
Filed Dec. 2, 1930     2 Sheets-Sheet 2

Inventors
P. A. Nirdlinger,
C. D. Nirdlinger,
E. M. Miller

Patented Mar. 14, 1933

1,901,527

UNITED STATES PATENT OFFICE

PATRICK A. NIRDLINGER, CLARENCE D. NIRDLINGER, AND EDWARD M. MILLER, OF CHICAGO, ILLINOIS, ASSIGNORS, BY DIRECT AND MESNE ASSIGNMENTS, TO OPERAY LABORATORIES, INC., OF MADISON, WISCONSIN, A CORPORATION OF WISCONSIN

UNIVERSAL JOINT AND SUPPORTING STRUCTURE FOR ILLUMINATING DEVICES

Application filed December 2, 1930. Serial No. 499,552.

The present invention relates to improvements in universal joints, and particularly to joints intended for supporting illuminating units for use in surgical operating rooms.

While certain features of the invention are adapted for use with joints for other purposes, the particular embodiment illustrated in the accompanying drawings has been found particularly adapted for use in supports for illuminating units as disclosed in patent of Patrick A. Nirdlinger, No. 1,596,371, dated August 17, 1926.

Among the objects of the invention may be mentioned the facility with which the parts of the joint may be adjusted to insure that the parts will be frictionally held in the desired relation while permitting such manual adjustment as may be called for by the operation of the device.

In the drawings:—

Figure 1 is an elevation of a portion of a support for an illuminating unit comprising a joint embodying the present invention.

Figure 2 is an end view of parts shown in Figure 1.

Figure 3 is a vertical section substantially on the line 3—3 of Figure 2.

Figure 4 is a sectional view substantially at right angles to Figure 3.

Figure 5 is a view of one of the elements of the improved joint detached.

Figure 6 is a view similar to Figure 4 of a slightly modified form.

Figure 7:
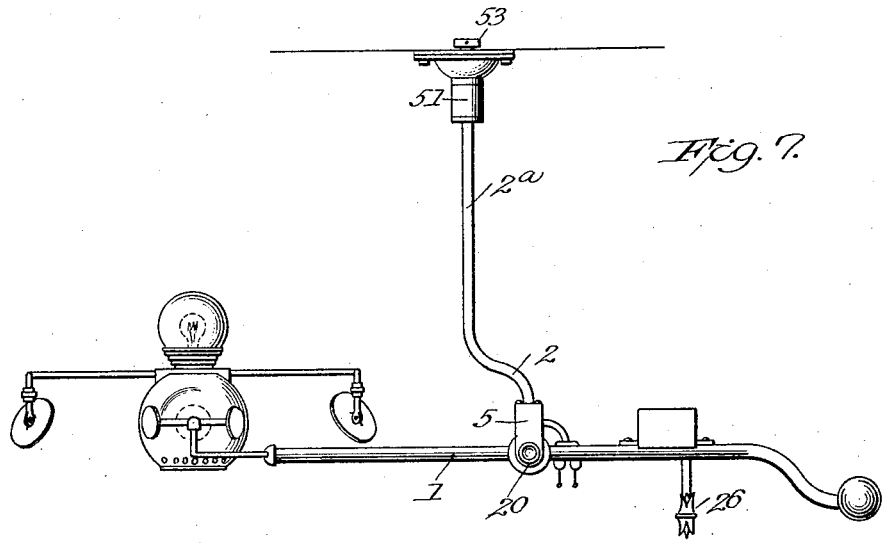
Figure 7 is an elevation of a slightly modified form of a support.

Referring to the drawings, in the several views of which like parts are designated by the same reference characters, 1 designates an elongated, rod-like supporting member which corresponds, for example, to the lamp supporting rod of the Nirdlinger Patent No. 1,596,371, and this arm is supported by the improved joint that will be hereinafter described from a tubular hanger 2, that may be connected at its upper end to a suitable ceiling block or other means, not shown. The members 1, 2, are preferably of tubular form, and a flexible conduit 3 is provided for conducting wires from the suspension member 2 to the interior of the supporting arm 1.

As shown, a cap 4 is secured to the lower end of the suspension member 2 and about said member above this cap are fitted the upper portions of bracket-like arms 5. The arms 5 are connected so that they may turn bodily about the member 2, and in each of the depending parallel arm sections are formed apertures which receive trunnions 6, 6a, mounted on the main supporting member 1.

As shown, the trunnions 6, 6a, are formed integral with and project diametrically opposite from a collar 7, which loosely surrounds the member 1, so that the latter may be moved about its longitudinal axis within said collar.

On the member 1 about the collar 7 is arranged a substantially spherical-shaped body 8, which is provided with segmental slots through which the trunnions 6, 6a, extend.

The trunnions, as before described, extend through aligned apertures in the bracket arms 5, and by reason of their relation to the member 1, it will be seen that the latter can be bodily rocked about the axis of said trunnions, or about an axis extending lengthwise of the main supporting member 1, this latter movement being made possible by the aforesaid slots in the body 8, and being limited by stops 9 at the ends of said slots.

The body 8 may be securely fastened to the supporting member 1, so as to always move therewith by any suitable means. As shown, set screws 10, arranged within suitable sockets in said body are provided.

On the trunnions, between the body 8 and the bracket arms 5, are mounted two clamping members 11, each having a concaved face which conforms to and receives the adjacent portion of the surface of the body 8.

Each clamping member 11 is provided with recesses 12, to receive the member 1, and with an aperture 13, through which the supporting trunnion 6 or 6a extends.

Means are provided whereby the clamping members 11 may be bodily moved into such close engagement with the spherical-shaped body 8 as to hold the latter and the supporting member 1 in any of the adjusted positions to which said member may be moved.

As shown, the outer sections of the trunnions which extend beyond the arms 5 are threaded and on the trunnion 6 is secured a nut 14, which bears closely against a washer 15, which is interposed between the nut and the adjacent bracket arm 5.

The extreme end of the trunnion 6a is concealed by the ornamental cap member 16. A washer 17 surrounds the trunnion 6 beyond the adjacent bracket arm 5 and bears closely against said arm. A nut-like cap having an extended hand-piece 20 is screwed on the outer end of the trunnion 6, the inner end of such nut extending into a cavity or seat formed in the outer face of the washer 17. It will be seen that by rotating the cap nut 20, the clamping members 11 will be forced inward so that the concave surfaces thereof will closely bear against the spherical-shaped body 8, and thus form an effective means for holding said body and the member 1 on which it is mounted in any adjusted position.

In order that the initial movement of the clamping members 11 just described may be relatively yielding, it is proposed to provide a spring 21 within the cavity in the outer face of said member 17.

It will be seen that by the construction described the supporting member 1 will be frictionally held against accidental or unintentional movement in any adjusted position but can be manually rocked about either of the axes referred to so as to position the illuminating unit or other means carried thereby, as desired. If necessary, the control handle 20 can be easily adjusted to compensate for any wear that may occur between the contacting surfaces.

Preferably, as shown, the inner faces of the clamping members 11 do not abut when they are closed to their maximum extent upon the body 8, and a casing or sleeve 30 is shown as arranged over the space or gap which separates the inner faces of said member.

In the modification shown in Figure 6, springs 40 are arranged in suitable sockets formed in the adjacent faces of the clamping members 11 instead of having a spring, as at 21, about a trunnion. With the modified structure the springs will be compressed as the clamping members are drawn into engagement with the ball-shaped body 8, and when the pressure is released by properly turning the screw nut 20, said springs will act to positively separate or force the clamping members apart.

Figure 8:
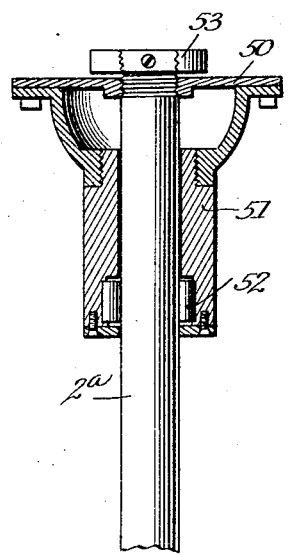
Figure 8 is a vertical section, on an enlarged scale, of a portion of the support of Figure 7.
Figure 9:
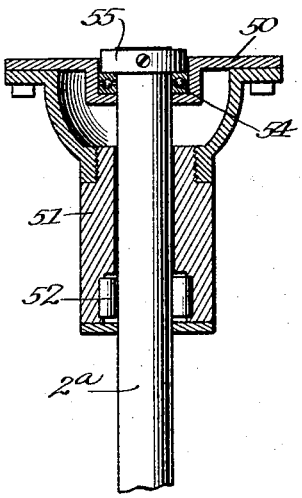
Figure 9 is a view similar to Figure 8 of a slightly different arrangement.

Figures 7 to 9 inclusive illustrate a slightly modified form of a support for an illuminating unit including the joint hereinbefore described.

In this embodiment the hanger by which the lamp carrying arm 1 is supported is of such form that the lower portion thereof, on which the arm 1 is mounted by the joint hereinbefore described, is offset from the axis of the section thereof which is supported by a suitable ceiling block.

The upper section 2a of the tubular hanger is connected with a plate-like member 50, adapted to be attached by means not shown to a suitable ceiling block and the connection between said hanger and member 50 is such that the hanger and parts supported thereby may be turned as a unit about the vertical axis of the hanger.

The bracket arms 5 as previously described are preferably arranged to turn about the hanger 2 and when the entire structure is rotated about the axis of the section 2a of the hanger, it will be seen that the illuminating unit may be adjusted over an area greater than would be the case if the hanger were straight and did not have the lower portion thereof offset from the section connected with the ceiling block.

Because of the swivel connection at the upper end of the rod 2a and the swivelled connection between the lower end thereof and the arm supporting bracket 5, the lamp may be laterally displaced in a horizontal, straight line direction by movement imparted thereto through the operating handle 26. It will be apparent that a wide range of adjustment may be accomplished by the combined rotation of the rod 2 in the ceiling bracket and of the bracket 5 on the lower end thereof. Through the medium of the off-set curve in the supporting rod and the dual swivel connection at its two ends, and the universal joint 20, the light may be adjusted to any desired position within its range of movement.

Various forms of connection between the hanger section 2a and the supporting plate-like member 50 may be provided. Preferably, the upper portion of the hanger extends through a casing 51 extending downward from the plate 50 and in which are positioned suitable anti-friction rollers 52 that contact with the hanger section 2a.

In the form shown in Figure 8, the upper end of the hanger is threaded and engages a suitable thread on the plate 50, its extremity projecting into the chamber in the usual ceiling block, not shown. A stop nut 53 is provided for limiting the rotary movement of the hanger and parts supported thereby.

In the form shown in Figure 9, an anti-friction bearing 54 is arranged in a seat depending from the plate 50 and the hanger section 2a has an enlargement of washer 55 which is supported on such bearing.

The lamp carrying arm 1, by means of the joint before described, can be manipulated by the handle 26 and when the control handle 20 is properly adjusted, the members of the joint and rod will be so connected that by means of said handle 26, the arm and parts carried thereby will be rotated as a unit about the vertical axis between the hanger and ceiling blocks.

It is believed that the operation and advantages of the invention will be readily understood from the foregoing description and drawing.

It will be seen that the invention provides a very simple means for supporting an illuminating unit, for example, or any other body, in a manner which permits of its being readily adjusted about any of a plurality of axes and enables the parts to be frictionally held in any desired adjusted position, while permitting the necessary movement in using the apparatus.

It is, of course, to be understood that the drawing is to be considered as illustrative rather than restrictive of the invention, and that there can be changes and departures from the exact arrangement shown without departing from the invention.

What is claimed is:—

1. A joint of the character described, comprising an elongated rod, a collar having diametrically projecting trunnions slidably mounted on said rod, a ball member fixed on said rod intermediate its ends, said ball member having a cylindrical bore through which said rod projects and a recess in which said collar is disposed, said ball member also having segmental slots communicating with said recess through which said trunnions project, whereby said trunnions may move in said slots to permit said rod and said ball to oscillate on the axis of said rod, a pair of socket members for said ball member mounted for axial movement on said trunnions, a pair of supporting members for said joint in which said trunnions are journalled for oscillation on their common axis, said supporting members being mounted outside of said socket members for axial movement on said trunnions, and clamping means on said trunnions to force said supporting members, said socket members, and said ball member into frictional contact.

2. A joint of the character described, comprising an elongated rod, a collar having diametrically projecting trunnions slidably mounted on said rod, a ball member fixed on said rod intermediate its ends, said ball member having a cylindrical bore through which said rod projects and a recess in which said collar is disposed, said ball member also having segmental slots communicating with said recess and through which said trunnions project, whereby said trunnions may move in said slots to permit said rod and said ball member to oscillate on the axis of said rod, a pair of socket members for said ball member mounted for axial movement on said trunnions, a pair of supporting members for said joint in which said trunnions are journalled for oscillation on their common axis, said supporting members being mounted outside of said socket members for axial movement on said trunnions, and means adjustably connected with one of said trunnions for moving said supporting members, and said socket members toward said ball member into frictional contact.

3. A joint of the character described, comprising an elongated rod, a collar having diametrically projecting trunnions slidably mounted on said rod, a ball member fixed on said rod having a cylindrical bore through which said rod projects, said ball member having a recess in which said collar is disposed, said ball member also having segmental slots communicating with said recess and through which said trunnions project, whereby said trunnions may move in said slots to permit said rod and said ball member fixed thereon to oscillate on the axis of said rod, a pair of socket members for said ball member mounted for axial movement on said trunnions, a pair of supporting members for said joint in which said trunnions are journalled for oscillation about their common axis, said supporting members being mounted outside of said socket members for axial movement on said trunnions, and spring pressed clamping means on said trunnions to force said supporting members, said socket members, and said ball member into frictional contact.

4. A joint of the character described, comprising an elongated rod, a collar having diametrically projecting trunnions slidably mounted on said rod, a ball member fixed on said rod having a cylindrical bore through which said rod projects, said ball member having a recess in which said collar is disposed, said ball member also having segmental slots communicating with said recess and through which said trunnions project, whereby said trunnions may move in said slots to permit said rod and said ball member fixed thereon to oscillate on the axis of said rod, a pair of socket members for said ball member mounted for axial movement on said trunnions, a pair of supporting members for said joint in which said trunnions are journalled for oscillation about their common axis, said supporting members being mounted outside of said socket members for axial movement on said trunnions, and clamping means on said trunnions to force said socket members and said ball member into frictional contact, said clamping means comprising resilient means for first urging said parts into frictional contact, and positive means for subsequently forcing said parts into binding contact.

5. A support for a lighting unit comprising a rod having a vertically disposed upper end portion journaled for rotation on a vertical axis in a ceiling bracket and a vertically disposed lower end portion laterally offset from said upper portion and connected thereto by an intermediate portion including an off-set curve, a bracket mounted on said lower end of said rod for rotation with respect thereto on a vertical axis, a substantially horizontal arm carried by said bracket and having a lighting unit mounted on one end thereof, whereby said lighting unit may be moved in a substantially horizontal straight-line direction by combined rotation of said rod in said ceiling bracket and said arm bracket on said lower end of said rod.

6. A support for a lighting unit comprising a rod having a vertically disposed upper end portion journaled for rotation on a vertical axis in a ceiling bracket and a vertically disposed lower end portion laterally off-set from said upper portion and connected thereto by an intermediate portion including an off-set curve, a bracket mounted on said lower end of said rod for rotation with respect thereto on a vertical axis, a substantially horizontal arm carried by said bracket and extending a substantial distance on opposite sides of said bracket and having a lighting unit mounted on one end thereof, and an operating handle adjacent the other end of said arm, whereby said lighting unit may be moved in a substantially horizontal straight-line direction by manipulation of said handle causing combined rotation of said rod in said ceiling bracket and said arm bracket on said lower end of said rod.

In testimony whereof we have hereunto set our hands.

PATRICK A. NIRDLINGER.
CLARENCE D. NIRDLINGER.
EDWARD M. MILLER.